Patented Mar. 9, 1943

UNITED STATES PATENT OFFICE 2,313,621

CAPILLARY-ACTIVE COMPOSITION

Herman A. Bruson, Philadelphia, Pa., assignor to Röhm & Haas Company, Philadelphia, Pa.

No Drawing. Application June 14, 1939,
Serial No. 279,059

6 Claims. (Cl. 252—352)

This invention relates to a new type of wetting, cleansing, emulsifying, and dispersing agent and has for its object the utilization of a class of compounds as capillary-active substances which lack the strong ionogenic groups found in sulfates, sulfonates, and the like and which are different, on the other hand, from the truly non-ionogenic compounds which lack powerful directional forces.

I have found that the water-soluble alkali metal enolates of diketones having the grouping —CO—CH$_2$—CO— and containing a cyclo-aliphatic, aryl-aliphatic, alkylated aromatic, or aliphatic group of at least six carbon atoms, the chain of which may be interrupted by —O—, —S—, or —CO— groups, display capillary-activity and possess the property of lowering the surface tension of water, as well as the interfacial tension between water and oils. This property has heretofore been associated with water-soluble salts of long chain fatty acids, sulfonic acids, sulfuric esters, phosphoric esters and the like, but has not, so far as I am aware, been reported for the higher β- or 1,3-diketones which lack these acid groups.

As a matter of fact, the sodium and potassium derivatives of the higher 1,3-diketones of the type above set forth are soluble in water as well as in oils or hydrocarbons and are unusually effective wetting, cleansing, dispersing, emulsifying, and penetrating agents. These compounds are obtainable by condensing the appropriate esters with methyl ketones such as acetone and its homologues such as methyl ethyl ketone, methyl propyl ketone, methyl hexyl ketone, methyl undecyl ketone, methyl heptenone, methyl phenyl ketone, methyl benzyl ketone, etc., in the presence of sodium (Ber. 22, 1009) or by condensing the appropriate acid anhydrides with methyl ketones in the presence of boron trifluoride (Ber. 66, 414 (1933)). Appropriate esters include the methyl, ethyl, propyl, butyl, etc. esters of such acids as acetic, caproic, caprylic, capric, palmitic, isovaleric, α-ethyl hexoic, undecylenic, oleic, sebacic, the various naphthenic acids, abietic acid, butoxyacetic, caproxyacetic, phenoxyacetic, octylphenoxyacetic, octylthioacetic, butylthioacetic, actylbenzoic, benzoylbenzoic, etc. It will be obvious that the balance of hydrophobic group and hydrophilic group required for capillary activity may be obtained with long chains from either the methyl ketone or the ester, or from both. The exact nature of the hydrophobic groups is not of major importance providing they are free from highly polar groups such as carboxylic, nitro, or sulfonic groups and the like, since it has been established that, when strongly polar groups are scattered about a molecule, there is a lack of the hydrophobe-hydrophile balance which is essential for proper wetting and detergent action.

These polar groups are capable of forming salts or of imparting a degree of solubility which negates the hydrophobic properties of the carbon chain.

The capillary-active β-ketones may be represented by the following general formula

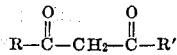

where R and R' represent organic aliphatic, cycloaliphatic, arylaliphatic, or alkylated aromatic radicals, at least one of which possesses a minimum of six carbon atoms, and which are devoid of polar groups.

The alkali metal enolates of the following compounds, for example, possess marked capillary-activity and may be employed as textile assistants, bactericides, emulsifying agents, froth-producing agents, flotation agents, wetting agents for pigments or porous textile materials, dyeing assistants, and in various phases of cleansing, mercerizing, bleaching, and tanning operations:

Decanedione-2,4

CH$_3$(CH$_2$)$_5$COCH$_2$COCH$_3$ (from methyl hexyl ketone and ethyl acetate by means of sodium; or with acetic anhydride and BF$_3$).

Dodecanedione-2,4

CH$_3$(CH$_2$)$_7$COCH$_2$COCH$_3$ (from ethyl pelargonate and acetone by means of sodium).

Pentadecanedione-2,4

CH$_3$(CH$_2$)$_{10}$—COCH$_2$COCH$_3$ (from ethyl laureate and acetone by means of sodium).

Heneicosanedione-2,4

CH$_3$(CH$_2$)$_{16}$—COCH$_2$COCH$_3$ (from ethyl stearate, acetone and sodium).

Naphthanedione-2,4

(from ethyl naphthenate, acetone, and sodium).

Octyloxypentanedione-2,4

C$_8$H$_{17}$—O—CH$_2$CO—CH$_2$COCH$_3$ (from ethyl octyloxyacetate, acetone, and sodium).

Dodecylthiopentanedione-2,4

C$_{12}$H$_{25}$—S—CH$_2$COCH$_2$COCH$_3$ (from lauryl thioacetic ethyl ester, acetone, and Na).

Hexadecanedi-dione-2,4,13,15

CH$_3$—CO—CH$_2$—CO—(CH$_2$)$_8$—CO—CH$_2$COCH$_3$ (from diethyl sebacate, acetone, and sodium).

P-ter-octylphenoxypentanedione-2,4

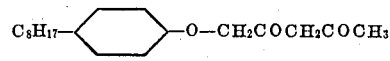

(from p-ter-octylphenoxyacetic ethyl ester, acetone, and sodium).

Octylbenzoylacetone

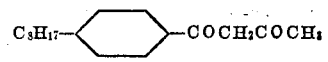

(from ethyl octylbenzoate, acetone and sodium).

The sodium or potassium enolates of the above compounds and their homologues of the type herein set forth can be used as such, or in combination with ordinary fatty acid soaps or other detergent materials to improve the properties of the latter. They may be used for wetting out pigments such as carbon black, sulfur, zinc oxide, titanium dioxide, Portland cement, and the like. They may be used in water or in naphtha as spot removers in dry-cleaning operations. Furthermore, they can be used for emulsifying insecticidal sprays with oils, petroleums, waxes, etc.; or they may be employed in cutting oils, finishing oils, and leather oils. They can be used for breaking certain types of petroleum emulsions.

For practical purposes, the sodium or potassium enolate of decanedione-2,4 is well adapted as a wetting, cleansing, and dispersing agent. Its solutions in water are clear and possess good sudsing properties. A 1% solution in kerosene or varnish-maker's naphtha wets out most pigments and can be added to varnish and paint compositions to promote gloss and pigment dispersion.

I claim:

1. A wetting, cleansing, dispersing, and emulsifying composition comprising water and an alkali metal enolate of a higher diketone having the formula

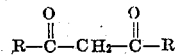

wherein R and R' represent organic radicals selected from the group consisting of cycloaliphatic, arylaliphatic, alkylated aromatic, and aliphatic radicals, at least one of which possesses a minimum of six carbon atoms and both of which are devoid of polar groups.

2. A wetting, cleansing, dispersing, and emulsifying composition comprising water and an alkali metal enolate of a higher diketone having the formula

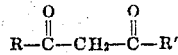

wherein R' represents a methyl group and R represents an alkyl group of at least six carbon atoms.

3. A wetting, cleansing, dispersing, and emulsifying composition comprising water and an alkali metal enolate of decanedione-2,4.

4. A wetting, cleansing, dispersing, and emulsifying composition comprising an alkali metal enolate of a higher diketone having the formula

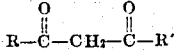

wherein R and R' represent organic radicals selected from the group consisting of cycloaliphatic, arylaliphatic, alkylated aromatic, and aliphatic radicals, at least one of which possesses a minimum of six carbon atoms and both of which are devoid of polar groups, dissolved in a solvent therefor.

5. A wetting, cleansing, dispersing and emulsifying composition comprising water and an alkali metal enolate of pentadecanedione-2,4.

6. A wetting, cleansing, dispersing and emulsifying composition comprising water and an alkali metal enolate of heneicosanedione-2,4.

HERMAN A. BRUSON.